United States Patent
Jeong et al.

(10) Patent No.: US 6,862,035 B2
(45) Date of Patent: Mar. 1, 2005

(54) SYSTEM FOR MATCHING STEREO IMAGE IN REAL TIME

(75) Inventors: Hong Jeong, Kyungsangbuk-do (KR); Yun-Soo Oh, Kyungsangbuk-do (JP)

(73) Assignee: Ohang University of Science and Technology Foundation, Kyungsangbuk-Do (KR)

( * ) Notice: Subject to any disclaimer, the term of this patent is extended or adjusted under 35 U.S.C. 154(b) by 646 days.

(21) Appl. No.: 09/865,693

(22) Filed: May 29, 2001

(65) Prior Publication Data

US 2002/0025075 A1 Feb. 28, 2002

(30) Foreign Application Priority Data

Jul. 19, 2000 (KR) ......................................... 2000-41424

(51) Int. Cl.7 .............................................. H04N 13/00
(52) U.S. Cl. ......................................... 348/42; 345/419
(58) Field of Search .............................. 348/42–43, 47, 348/51, 56; 345/419; 356/2

(56) References Cited

U.S. PATENT DOCUMENTS 4,562,463 A * 12/1985 Lipton .......................... 348/56
5,383,013 A * 1/1995 Cox .............................. 356/2
5,740,337 A * 4/1998 Okino et al. ................ 345/419

FOREIGN PATENT DOCUMENTS

| DE | 40 15 959 A | 11/1991 |
| EP | 0 158 984 | 10/1985 |
| EP | 0 957 642 | 11/1999 |
| KR | 1999-80351 | 11/1999 |
| WO | WO 99/53681 | 10/1999 |

* cited by examiner

Primary Examiner—Gims Philippe
(74) Attorney, Agent, or Firm—Leydig, Voit & Mayer, Ltd.

(57) ABSTRACT

A system for processing stereo matching of a video image sequence in a real-time mode. The system includes a signal converter for converting an image input from a first camera and a second camera into a digital signal; and an image matching clip for calculating a determined matching cost based on a pair of pixels in one scan line of the first and second digital image signals, tracing the decision value which determines the minimum matching cost, and outputting the decided value as an estimated disparity according to determined activation information; and a display for displaying the output from the image matching. According to the system, real-time stereo matching is enabled by parallel processing or video image sequences using an algorithm which is based on a new dynamic trellis based method and is optimal in the Bayesian sense.

11 Claims, 4 Drawing Sheets

SYSTEM FOR MATCHING STEREO IMAGE IN REAL TIME

BACKGROUND OF THE INVENTION

1. Field of the Invention

The present invention relates to an image processing system, and more particularly, to a system for matching a stereo image of a video image sequence in a real-time mode.

2. Description of the Related Art

Stereo matching is the core process of a stereo vision in which 3-dimensional spatial information is re-created using a pair of 2-dimensional images. In an article [Uemsh R. Dhond and J. K. Aggarwal. Structure from stereo—a review. IEEE Transactions on Systems, Man, and Cybernetics, 19(6):553–572, November/December 1989], basic issues related to stereo vision and some important research fields can be found. Typically, a pair of cameras having the same optical characteristics are aligned with focal planes on the same plane. This permits the horizontal scan lines to be the same in each image. If a pixel in each image corresponding to the same point in a 3-dimensional space can be found, the distance to the 3-dimensional (3-D) point from the cameras can be found using a simple geometrical characteristics. Some pixels in each image may not have matching pixels in the other image, which is known as an occlusion. In the processing, the most difficult part is to find the matching pixels, that is, a stereo matching.

3-D reconstruction is very important in such fields as mapping, geology, testing, inspection, navigation, virtual reality, medicine, etc. Many of these fields require the information in real-time because the fields must respond immediately to information available. This is especially true in robotics and autonomous vehicles.

In an article [Stuart Geman and Donald Geman. Stochastic relaxation, Gibbs distributions, and the Bayesian restoration of images. IEEE Transactions on Pattern Analysis and Machine Intelligence, PAMI-6(6):721–741, November 1984], a stereo matching method using Markov random fields and stochastic optimization methods, based on simulated annealing presented by S. Kirkpatrick et al., "Optimization by Simulated Annealing", Science, May 1983, pg. 671–680, is described. This has been further developed by others, for example, Geiger and Girosi using mean field theory. However, this class of methods is iterative in nature resulting in very long computational times that are not suitable for real time stereo matching.

In an article [H. H. Baker and T. O. Binford. Depth from edge and intensity based stereo. In Proceedings of the International Joint Conference on Artificial Intelligence, page 631–636, Vancouver, Canada, 1981] and an article [Y. Ohta and T. Kanade. Stereo by intra- and inter-scan line search. IEEE Transactions on Pattern Analysis and Machine Intelligence, PAMI-7(2):139–154, March 1985], stereo matching methods based on dynamic programming (DP) and heuristic post-processing are described. In an article [Ingemar J. Cox, Sunita L. Hingorani, Satish B. Rao, and Bruce M. Maggs. A maximum likelihood stereo algorithm. Computer Vision and Image Understanding, 63(3):542–567, May 1996] and an article [Stan Birchfield and Carlo Tomasi. Depth discontinuities by pixel-to-pixel stereo. In Proceeding of the IEEE International Conference on Computer Vision, pages 1073–1080m, Bombay, India, 1998], single-level DP in discrete pixel oriented methods are described. In an article [Peter N. Belhumeur. A Bayesian approach to binocular stereopsis. International Journal of Computer Vision, 19(3): 237–260, 1996], a more complex DP method with sub-pixel resolution is described. Though this class of methods is much faster than the Markov random field based ones, they do not scale well for parallel processing and are thus still unsuitable for real-time stereo matching.

SUMMARY OF THE INVENTION

To solve the above problems, it is an object of the present invention to provide a real-time stereo image matching system which enables real-time stereo matching, by parallel processing video image sequences using an algorithm which is based on a new trellis based method and is optimal in the Bayesian sense.

To accomplish another object of the present invention, there is also provided a real-time stereo image matching system having a signal converting means for converting an image input from a first camera and a second camera into a digital signal; and an image matching means for calculating a predetermined matching cost based on a pair of pixels in one scan line of the first and second digital image signals, tracing the decision value which determines the minimum matching cost, and outputting the decision value as an estimated disparity according to determined activation information; and a display means for displaying the output from the image matching means.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
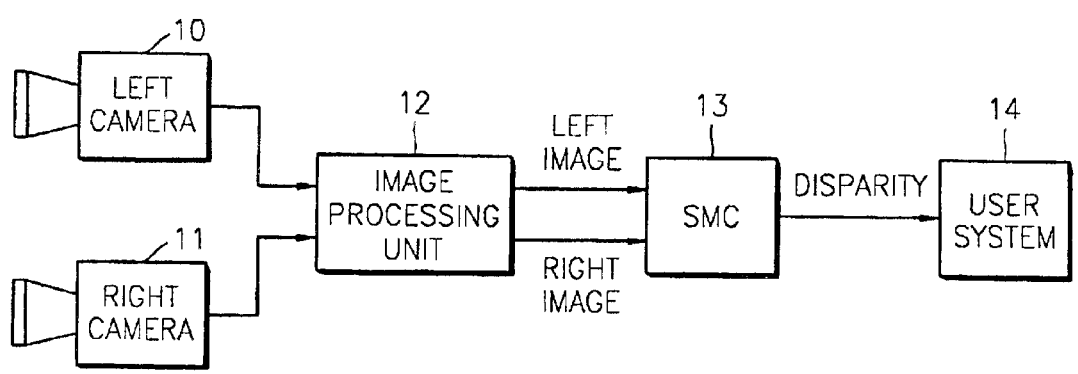
FIG. 1 is a block diagram of a real-time stereo image matching system according to the present invention.

FIG. 1 is a block diagram of a real-time stereo image matching system according to the present invention.

The system in FIG. 1 includes a left camera 10 for taking the left image of a scene, a right camera 11 for taking the right image of the scene, an image processing unit 12 for converting image signals of the left and right cameras 10 and 11 to digital form, a stereo matching chip (SMC) 13 for calculating the disparity of digitized left and right images, and a user system 14 for displaying or using an image based on the disparity. The image processing unit divides each image into M lines of N pixels, and these pixels are sent sequentially to the SMC. Each pixel represents a characteristic (e.g., intensity) of the image in the pixel region.

Figure 2:
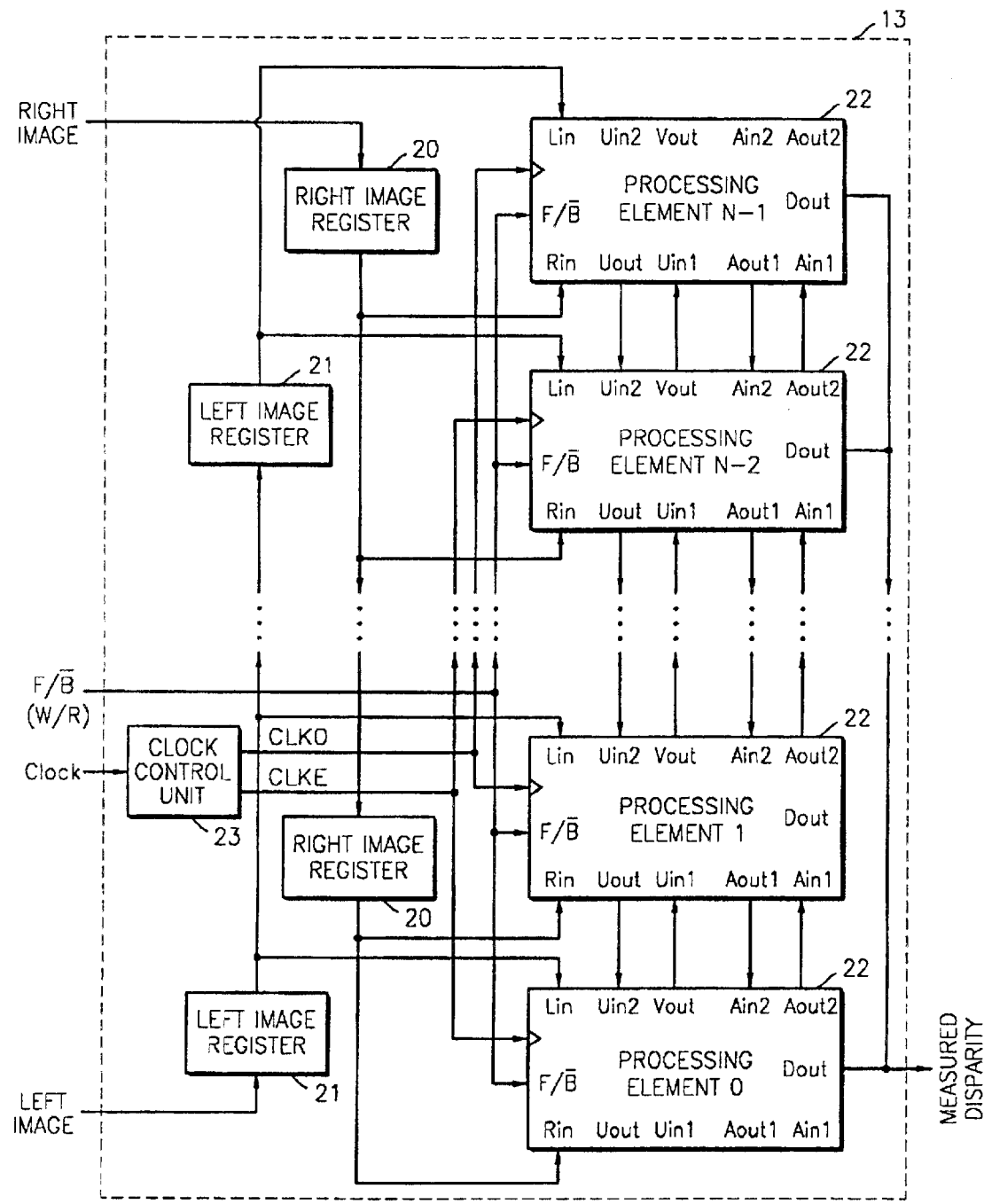
FIG. 2 is a detailed diagram of a stereo matching chip (SMC) of FIG. 1.

FIG. 2 is a detailed diagram of a stereo matching chip (SMC) of the system.

The SMC of FIG. 2 includes the right image registers 20, which is comprised of N/2 registers and stores the right image pixels from the image processing unit 12, the left image registers 21, which are formed of N/2 registers and stores the left image pixels from the image processing unit 12, a linear array of processing elements 22, which is comprised of N processing elements which together calculate the disparity from the left and right images, and a control unit 23 for providing clock signals to control the operation of the right image registers 20, left image registers 21, and processing elements 22 (here, N is a multiple of 2).

Figure 3:
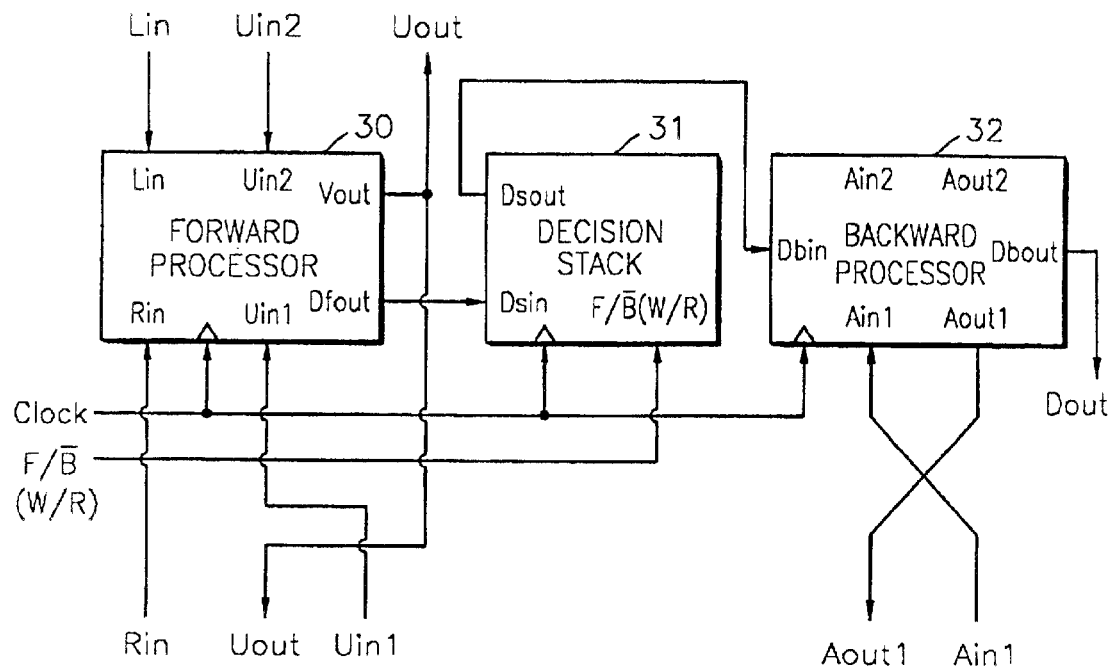
FIG. 3 is a detailed diagram of a processing element of FIG. 2.

FIG. 3 is a detailed diagram of a processing element of FIG. 2.

The processing element shown in FIG. 3 includes a forward processor 30, which has an input of a pixel in a scan line stored in the right image register 20 and the left image register 21 and outputs matching cost and decided value, a decision stack 31 for storing the decision value output from the forward processor 30, and a backward processor 32 which outputs the decided value, which is output from the decision stack 31 by an activation bit which decides whether or not to perform an operation, as a disparity.

Figure 4:
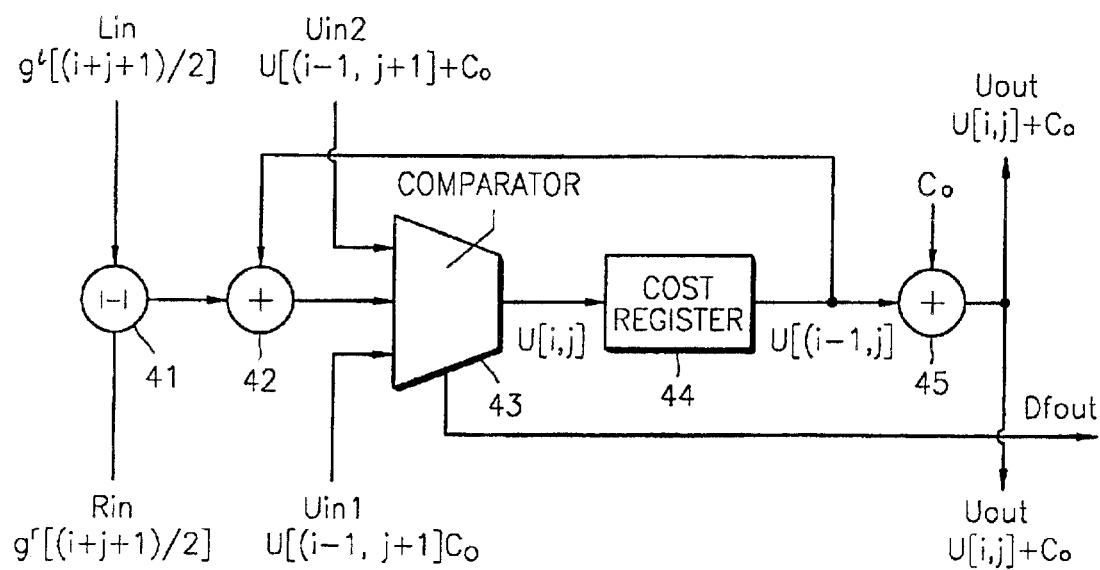
FIG. 4 is a detailed diagram of a forward processor of FIG. 3.

FIG. 4 is a detailed diagram of a forward processor of FIG. 3.

The forward processor of FIG. 4 includes a matching cost component 41 for calculating the cost of matching 2 pixels, by using the difference of each pixel of a line of the right image register 20 and the left image register 21, a first adder 42 which added the matching cost calculated in the absolute value calculating means 41 to the entire cost which is fed back, a comparator 43 which outputs the smallest cost and the decided value after comparing the output of the first adder 42 with the cost of the neighboring elements 22, a cost register 44 for storing the smallest cost output from the comparator 43 as an entire cost, and a second adder 45 which adds the entire cost stored in the cost register 44 to occlusion information to output the result of the addition to the neighboring elements 22.

Figure 5:
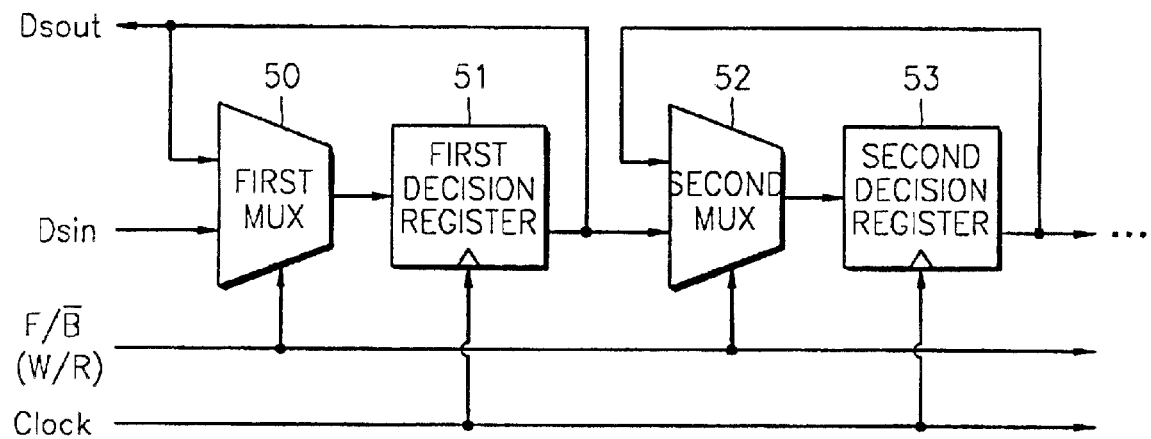
FIG. 5 is a detailed diagram of a decision stack of FIG. 3.

FIG. 5 is a detailed diagram of a decision stack of FIG. 3.

The decision stack of FIG. 5 includes a first multiplexer 50 (hereinafter referred to as "MUX") for selecting between the decided value output from the comparator 43 and the preceding decided value, a first decision register 51 which stores the decided value selected in the first MUX 50 and outputs the decided value to the first MUX 50 and the backward processor 32, a second MUX 52 for selecting between the decided value selected in the first decision register 51 and the fed-back decided value, and a second decision register 53 which stores the decided value selected in the second MUX 52 and feeds the decided value back to the second MUX 52. This structure is repeated N times.

Figure 6:
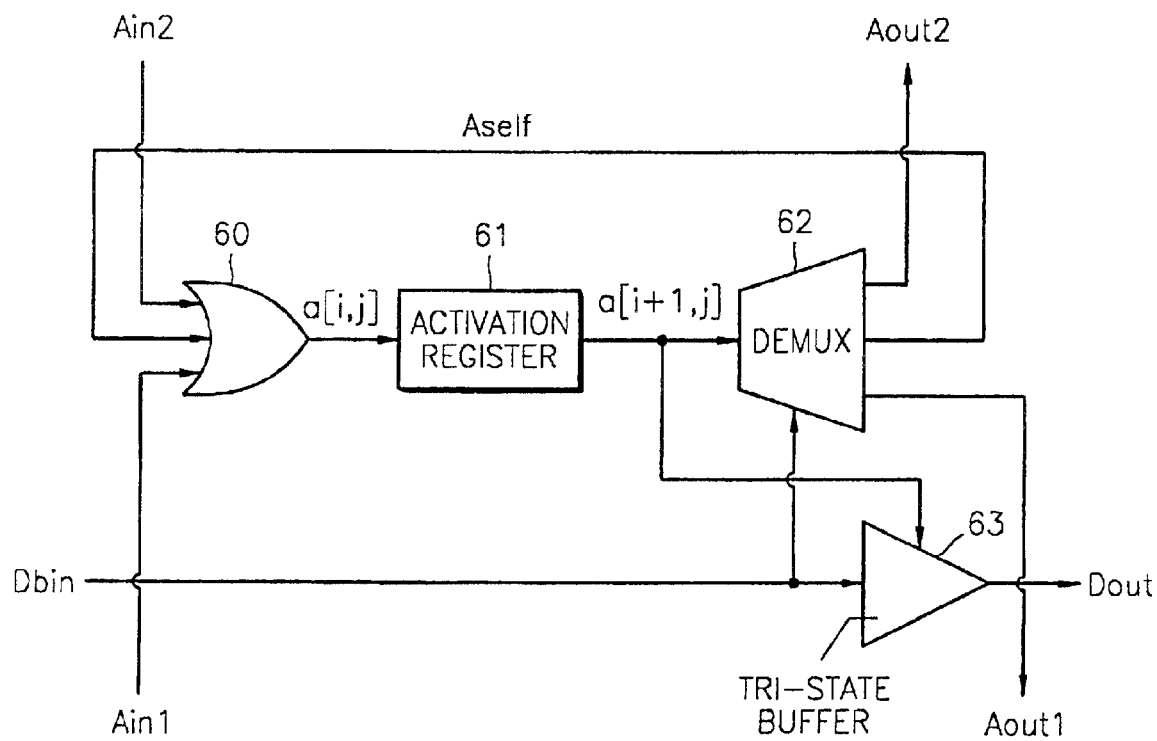
FIG. 6 is a detailed diagram of a backward processor of FIG. 3.

FIG. 6 is a detailed diagram of a backward processor of FIG. 3.

The backward processor of FIG. 3 includes an OR gate 60 which performs OR-ing of the previous activation information output of this and the neighboring processing elements to generate the current activation information, an activation register 61 for storing the previous activation information and the route which are the result of the OR-ing in the OR gate 60, a demultiplexer 62 (hereinafter referred to as "DEMUX") which multiplexes the last activation information route of the activation register 61 according to the decided value output from the decision stack 31 to output to neighboring processing elements 22 and OR gates 60, and a tri-state buffer 63 for outputting disparity using the decided value output from the decision stack 31 according to the activation information route of the activation register 61.

Referring to FIGS. 1 through 6, the present invention will now be explained in detail.

The system of the present invention is for calculating disparity from a pair of digital images. This disparity is directly related to the depth information, that is, the distance from the camera of each pixel in the image. The pair of images must be obtained from a pair of identical cameras 10 and 11 which have optical axes parallel to each other and focal planes on the same plane.

An image input to the left and right cameras 10 and 11 is converted into digital signals in the form of pixels in the image processing unit 12 and one scan line of each image is provided to the SMC 13 in units of a pixel. After the scan line is fully provided to the SMC 13, disparity data is output in units of a pixel. The process in which a disparity is output is repeated for all scan lines of the pair of images in the same way. Therefore, only the process for processing a pair of a scan lines will now be explained.

As shown in FIG. 2, the SMC 13 contains a linear array N identical processing elements 22 and two linear arrays, each of N/2 image registers 20 and 21. Here, N is a multiple of 2.

In a right image register 20, a pixel of the digitized right camera image 11 is stored, while a pixel of the digitized left camera image is stored in the left image 10 register 21.

The processing elements 22 can be extended in the form of a linear array to the designated maximum disparity, and each processing element 22 can exchange information with neighboring processing elements 22. This structure enables operation at the maximum speed regardless of the number of processing elements 22. Also, when the number of processing elements 22 is the same as the maximum disparity, this structure permits the matching process to keep pace with the video image flow.

The clock control unit 23 divides the system clock into two internal clocks to control the left and right registers 20 and 21, and processing elements 22. The ClkE output from the clock control unit 23 is toggled on the even-numbered system clock cycles (the first system clock cycle is defined as '0'), and provided to the even-numbered processing elements 22 and right image registers 20. The ClkO output from the clock control unit 23 is toggled on the odd-numbered system clock cycles, and provided to the odd-numbered processing elements 22 and left image registers 21.

Therefore, half of the processing elements 22 and half of the image registers (20 or 21) operate at every system clock cycle, beginning from the even-numbered processing elements 22 and right image registers 20. The processing step is controlled by read/write signal (F/B or R/W, hereinafter referred to as "R/W"). When an R/W signal line is in a high state, data is written and when the R/W signal line is in a low state, data is read.

Image pixel data is provided to the right image registers 20 and left image registers 21. At every system clock, one pixel of data is input to the right image register 20 and left image register 21, and a right image pixel is input by ClkE of the clock control unit 23 and a left image pixel is input by ClkO. By providing N/2 pairs of data to the processing elements 22, the right and left registers 20 and 21 are initialized. Here, the left image is provided (N/2−1) cycles after the right image is provided. Therefore, as the initial (N/2−1) data of the left image, arbitrary values can be provided.

In the last ClkO in the initializing process, after the first half of the data in the scan line of the right image is input to the processing elements 22, the first pixel in the scan line of the left image is input to the processing elements 22. At this time, registers inside each processing element 22 is set to an appropriate initial value. The initial value of the processing element 0 is '0' and the initial value of all the other processors is the maximum (or close to the maximum) possible value. Then, the processing process is continuously applied to all pixel data input at each system clock until data in the present scan line is all processed (ClkE is for the left image, and ClkO is for the right image).

Since the left image is input to the processing elements 22 after the delay, the input of the right image data ends before the input of the right image ends. At this time, the right image registers 20 continue to read data, but the data cannot affect the operation of the SMC 13. Therefore, the last (N/2−1) data in the ClkE cycle can have any value.

When the input of pixel data to the processing elements 22 ends, the R/W signal is set to a low state, and the activation bit of each of processing elements 22 is set to an appropriate value. The activation bit of the processing element 0 22 is set to the high state and the bits for other processing elements 1~N−1 22 are set to the low state. The high activation bit is passed from processing element 22 to processing element 22 at each system clock cycle and only one processor can have an activation bit in the high state in a given time. To prevent bus contention, only the output of the processing element 22 with the high activation bit is activated, while the outputs of all other processing elements are placed in a high-impedance state.

The disparity output provides the relative change in disparity (from an initial value of "0") at each step and can have the value −1, 0, or +1. The actual disparity value can also be output by accumulating or summing the relative disparity output.

Each processing element 22 is formed of the forward processor 30, decision stack 31, and backward processor 32, as shown in FIG. 3.

FIG. 4 illustrates a detailed diagram of the forward processor 30.

The matching cost calculator 41 calculates a matching cost, using the absolute value of the difference $|R_{in}-L_{in}|$ of the pixel $R_{in}$ of the right image register 20 and the pixel $L_{in}$ of the left image register 21. The calculated matching cost is added to the fed-back accumulated cost in the first adder 42 and is one of the inputs to the comparator 43 which has three inputs.

The remaining two inputs $U_{in}1$ and $U_{in}2$ of the comparator 43 are connected to the cost output terminals $U_{out}$ of neighboring processing elements 22. The comparator 43 selects the minimum value among the three inputs and sets the new accumulated cost to this minimum value at each clock signal. The decision value of the selected input is '−1' when $U_{in}1$ is the minimum value, '+1' when $U_{in}2$ is the minimum value, and '0' for the remaining case. The decision value is output as a $D_{fout}$ signal.

The second adder 45 adds the occlusion cost $C_o$ to the accumulated cost stored in the cost register 44 and outputs the result to the neighboring processing elements 22 through the $U_{out}$ terminal.

The decision stack 31 is formed of an array of 2-bit registers, operating in a last-in first-out (LIFO) mode, to store the three possible decided values. The detailed diagram of the decision stack 31 is shown in FIG. 5.

The data flow direction in the decision stack 31 is controlled by the R/W signal line. The signal of $D_{sin}$ is connected to $D_{fout}$ of the forward processor 30 and this data is written into the decision stack 31 when the R/W signal is set to Write (W).

The signal $D_{sout}$ is connected to $D_{bin}$ of the backward processor 32 and this data is read from the decision stack when the R/W signal is set to Read (R). Each decision register 51, 53, etc., has a MUX 50, 52, etc., in front that is controlled by the R/W signal enabling decision data to be added into or removed off the stack.

The backward processor 32 reconstructs an optimal disparity. The detailed diagram of the backward processor 32 is shown in FIG. 6.

The backward processor 32 has an activation register 61 for storing the activation bit. Only the backward processor 32 in which the activation bit is in a high state is considered to be active. The OR gate 60 performs OR-ing of the neighbor activation bit routes $A_{in}1$ and $A_{in}2$, and the feedback activation bit route $A_{self}$. The $A_{in}1$ terminal is connected to the $A_{out}2$ terminal of the processing element 22 below the present processing element 22 and the $A_{in}2$ terminal is connected to the $A_{out}1$ terminal of the processing element 22 above the present processing element 22. Only one processing element 22 is active at any time.

The new value of the activation bit is set to the activation register 61 when a clock signal is input to the backward processor 32. To control the DEMUX 62 having one input and three outputs, the backward processor 32 uses a value in $D_{bin}$ which is connected to the $D_{sout}$ of the decision stack 31. The outputs of the DEMUX 62 are $A_{out}1$, $A_{self}$, and $A_{out}2$ are the same as the activation bits if $D_{bin}$ is −1, 0, or +1, respectively, and otherwise the output is zero. Therefore $D_{bin}$ is used to control the direction in which the activation bit is sent.

If the activation bit is high, the tri-state buffer 63 is enabled and $D_{bin}$ is output as $D_{bout}$ and this value is output from the SMC 13 as the next disparity value, relative to the previous disparity value. Otherwise, the tri-state buffer 63 is in a high impedance state so that the tri-state buffer 63 does not interfere with the output of the other backward processor 32.

In another embodiment, instead of $D_{bin}$, the processor number is output as $D_{out}$. In the method in which $D_{bin}$ is output, the relative change in the disparity is output, while in the method in which the processor number is output, the actual disparity value is output.

In the present invention, matching of each pixel in a pair of scan lines is implemented by the following algorithm.

1. Forward Initialization: The cost of every node except node 0 is set to infinity or a very high value.

U[0, 0]=0

U[0, j]=∞, j∈{1, . . . , N−1}

2. Forward Recursion: The best route and cost are sought for each step i and site j.

```
For i=1 to 2N do:
    For each j∈{1, . . ., N-1}:
        If i + j is even
            U[i, j] = min_{k∈{-1, 0, +1}} U[i-1, j+k] + C_o k^2
            P[i, j] = arg min_{k∈{-1, 0, +1}} U[i-1, j+k] + C_o k^2
        If i + j is odd
```

$$U[i, j] = U[i-1, j] + \left| g^l\left[\frac{(i-j+1)}{2}\right] - g^r\left[\frac{(i+j+1)}{2}\right] \right|$$

$$P[i, j] = 0$$

3. Backward Initialization:
d[2N]=P[2N, 0]
4. Backward Recursion:
For i=2N to 1 do:
    d[i-1]=d[i]+P[i, d(i)]

The decisions P[i, j] are stored in the decision stack 31. The clock signal for the decision stack 31 controls the entire operations. The forward recursion is performed by the forward processor 30 and the backward recursion is performed by the backward processor 32.

According to the characteristic of this algorithm and the implementation method of the present invention, the core forward recursion can be performed for all depths in parallel using identical forward processors 30. As a result, one processing element 22 can perform one forward recursion in one site within the time that a camera outputs a single pixel. The same applies to the backward recursion and the backward processors 32. Since the processing elements 22 can be extended to the maximum disparity available, the present invention can process stereo image matching at the full speed of the image the output from a pair of video cameras.

Next, the structures of the processor and stack will now be explained.

1. The Structure for Forward Calculation

The structure of the forward processor 30 is shown in FIG. 4.

At a time i, the output U[i, j] of the comparator in the forward processor j 30 is as follows:

$$U[i, j] = \min_{k\in(-1,0,+1)} U[i-1, j+k] + rk^2 + (1-k^2)\left| g^i\left[\frac{(i-j+1)}{2}\right] - g^r\left[\frac{(i+j+1)}{2}\right] \right|$$

The output at each clock cycle is as follows:

$$P[i, j] = \arg\min_{k\in(-1,0,+1)} U[i-1, j+k] + rk^2 + (1-k^2)\left| g^i\left[\frac{(i-j+1)}{2}\right] - g^r\left[\frac{(i+j+1)}{2}\right] \right|$$

These outputs are stored in the array of the decision stack 31.

2. Decision Stack

The decision stack 31 is a last-in first-out (LIFO) register array formed of N words. Each word is formed of two bits. In each processing element 22, one decision stack 31 exists. During the processing of the forward processor 30, P[i,j] corresponding to each step is stored in the decision stack. During the processing of the backward processor 32, these decision values are output in the reverse order.

3. The Structure for Backward Calculation

The structure of the backtracking part of the algorithm is shown in FIG. 6. Since the output of the decision stack 31 for backward calculation is shifted to the opposite direction, the output is expressed as follows:

P[i,j] for i=2N to 0

At i=2N, all a[0ij] are initialized to '0' or low state, except a[0,0] which is initialized to '1' or high state. The activation output of each backward processors 32 are as follows:

Feed-back output ($A_{self}$): a[i+1, j] δ (P[i+1, j]), where $$\delta(x) = \begin{cases} 1 & \text{if } x = 0 \\ 0 & \text{otherwise} \end{cases}$$

Upward output ($A_{out}2$): a[i+1, j+1] δ (1-P[i+1, j+1]),
Downward output ($A_{out}1$): a[i+1, j-1] δ (-1-P[i+1, j-1]), At each clock cycle, the activation register 61 is updated as follows:

$$a[i, j] = \sum_{k\in-1,0,+1} a[i+1, j+k]\delta(-k - P[i+1, j+k])$$

The decision output $D_{out}$ of the backward processor 32 is as follows:

P*[i,j]=a[i, j]P[i,j]

The entire optimal relative disparity output at each cycle step is as follows:

$$P[i] = \sum_{j=0}^{N-1} P^*[i, j]$$

The present invention is not restricted to the above-described embodiments, and many variations are possible within the spirit and scope of the present invention. Therefore, the scope of the present invention is not determined by the description but by the accompanying claims.

According to the above-described invention, real-time stereo matching is enabled, by parallel processing of video image sequences using an algorithm which is based on a new trellis based method and is optimal in the Bayesian sense.

What is claimed is:

1. A real-time stereo-matching system comprising:

first and second cameras having respective parallel optical axes and co-planar focal planes;

signal converting means for converting an image input from the first camera and an image input from the second camera into respective digital signals;

first storage means for storing pixels of the digital image from the first camera;

second storage means for storing pixels of the digital image from second camera;

processing means including a plurality of even-numbered processors and a plurality of odd-numbered processors, for outputting an estimated disparity using pixels input from the first and second storage means; and clock control means for outputting a first clock signal provided to the even-numbered processors of the processing means and to the second storage means, and a second clock signal provided to the odd-numbered processors of the processing means and the first storage means, to control operation of the first and second storage means and the processing means.

2. The real-time stereo image matching system of claim 1, wherein the system includes N processing means, N/2 first storage means, and N/2 second storage means where N is an integer multiple of 2.

3. The real-time stereo image matching system of claim 2, wherein the processing means exchanges information with neighboring processing means.

4. The real-time stereo image matching system of claim 2, wherein, among the N processing means, only a processing means that outputs a predetermined disparity is activated at one time and the remaining processing means are in high impedance states.

5. A real-time stereo-matching system comprising:
first and second cameras having respective parallel optical axes and co-planar focal planes;
signal converting means for converting an image input from the first camera and an image input from the second camera into respective digital signals;
first storage means for storing pixels of the digital image from the first camera;
second storage means for storing pixels of the digital image from the second camera;
processing means for outputting an estimated disparity using pixels input from the first and second storage means; and
clock control means for outputting a clock signal for controlling operation of the first and second storage means and the processing means, wherein the first storage means and the second storage means are initialized when the processing means completes processing of pixels in one scan line.

6. A real-time stereo-matching system comprising:
first and second cameras having respective parallel optical axes and co-planar focal planes;
signal converting means for converting an image input from the first camera and an image input from the second camera into respective digital signals;
first storage means for storing pixels of the digital image from the first camera;
second storage means for storing pixels of the digital image from the second camera;
a forward processor receiving a pixel of one scan line of the digital images in the first and second storage means and outputting a matching cost and decision value;
decision storage means for storing the decision value output by the forward processor;
a backward processor for outputting an estimated disparity, using decision values output from the decision storage means, in response to activation information; and
clock control means outputting a clock signal for controlling operation of the first and second storage means and the forward and backward processors.

7. The real-time stereo image matching system of claim 6, wherein, when a write control signal is input from outside, the forward processor operates, and when a read control signal is input from outside, the backward processor operates.

8. The real-time stereo image matching system of claim 6, wherein the decision storage means has a last-in first-out structure in which the decision value that is output last from the forward processor is first input to the backward processor.

9. The real-time stereo image matching system of claim 6, wherein the first processor comprises:
matching cost calculating means for calculating a matching cost, using a pixel of one line of a digital image stored in the first storage means and the second storage means;
first adding means for adding the calculated matching cost to an accumulated cost;
comparing means for comparing the output of the first adding means with the costs of neighboring processing means, and then outputting the minimum matches of cost and decision value;
storage means for storing the minimum cost that is a comparison produced by the comparison means, as the accumulated cost; and
second adding means for adding an entire cost and an occlusion cost to produce a sum, and then outputting the sum to neighboring processing means.

10. The real-time stereo image matching system of claim 9, wherein the backward processor comprises:
logical OR means for OR-ing activation information of the neighboring processing means and feed-back activation information route;
a register for storing the last activation information produced by the logical OR means;
demultiplexing means for demultiplexing the last activation information according to the decision value output from the decision storage means and outputting to the neighboring processing means and feeding back to the logical OR means; and
a tri-state buffer for outputting the decision value output from the decision storage means, as a determined disparity, according to the activation information of the register.

11. The real-time stereo image matching system of claim 10, wherein the output from the decision storage means controls which direction the demultiplexing means passes the activation information.

* * * * *